UNITED STATES PATENT OFFICE.

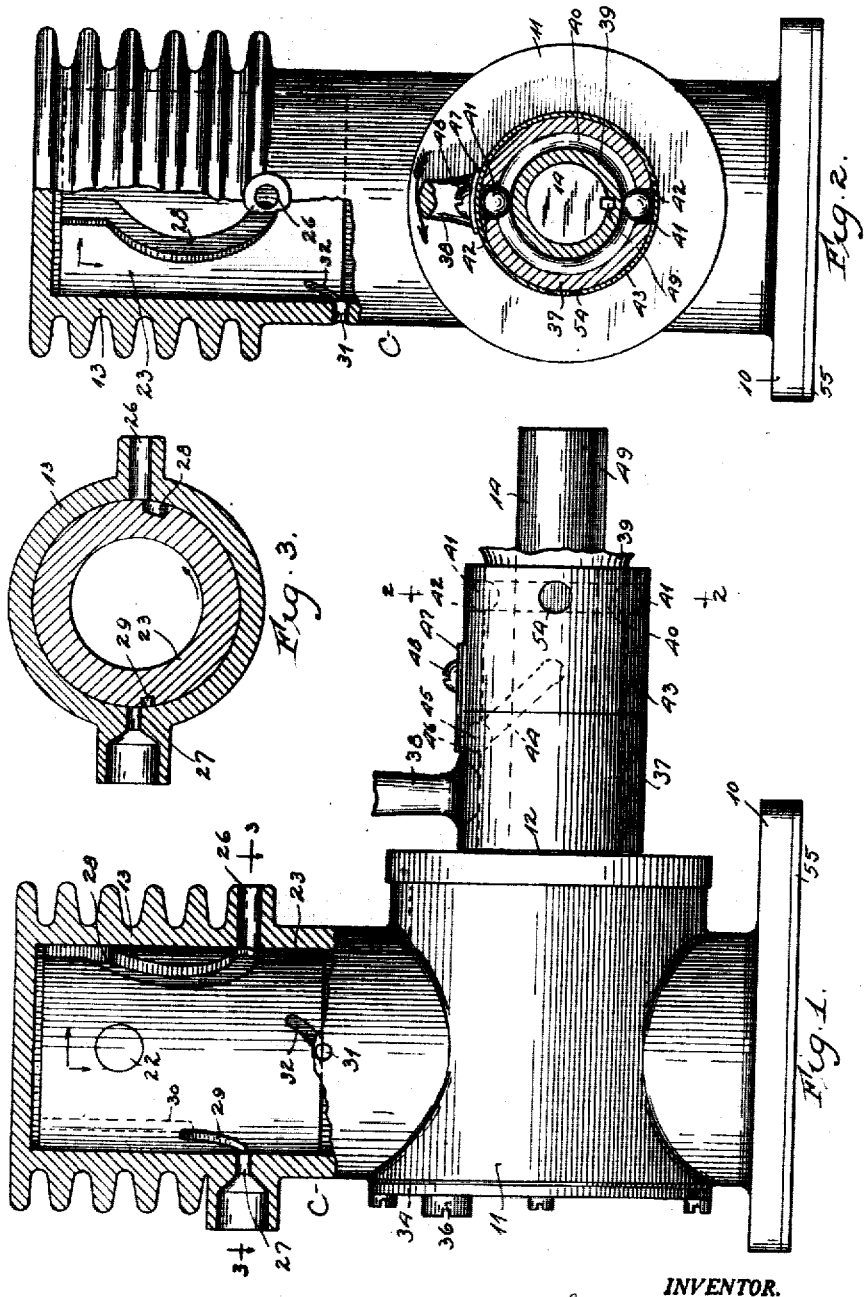

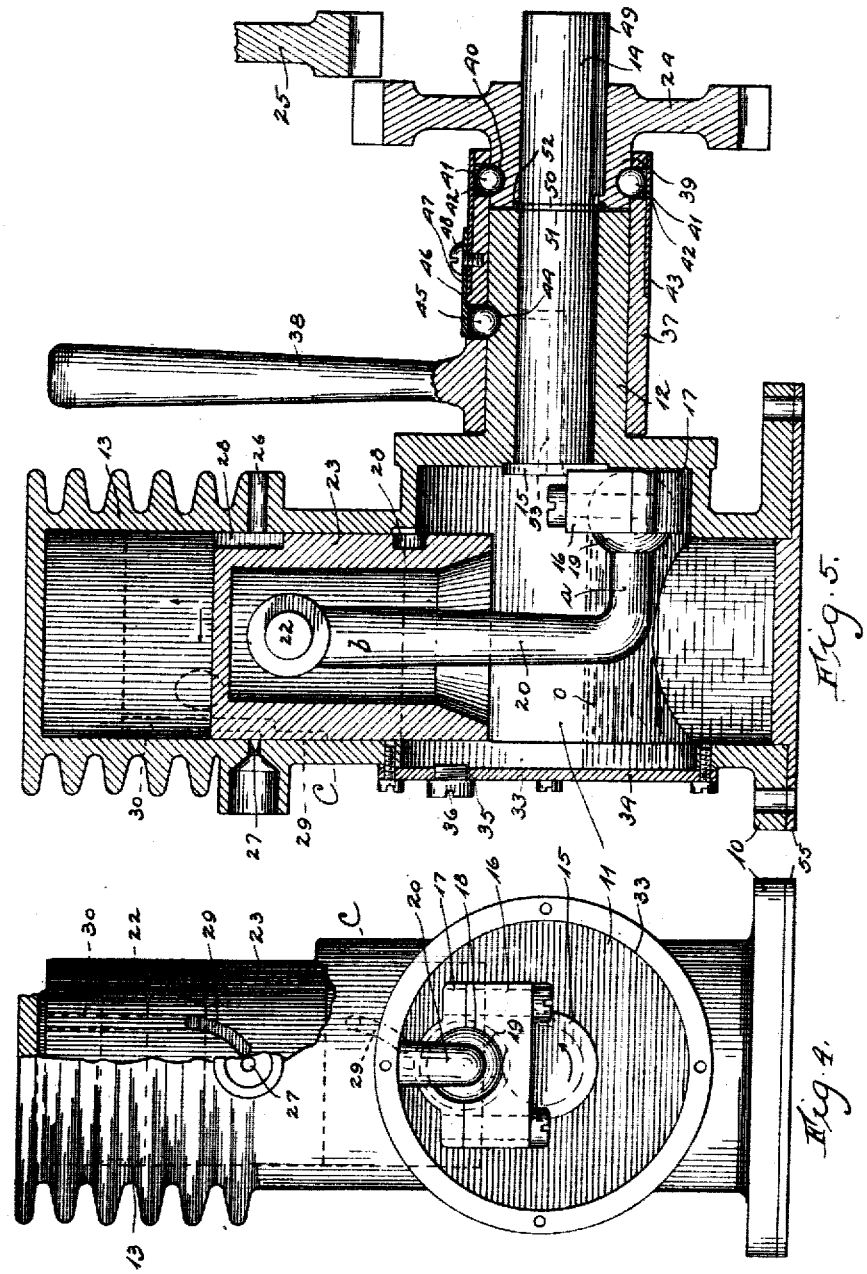

CHARLES A. ANDERSON, OF CHICAGO, ILLINOIS, ASSIGNOR OF TWENTY-TWO AND FIVE-TENTHS ONE-HUNDREDTHS TO EARL L. COOK AND TWENTY-TWO AND FIVE-TENTHS ONE-HUNDREDTHS TO JOHN ALGOT OLSON, BOTH OF CHICAGO, ILLINOIS.

FLUID-PUMP.

1,267,040.   Specification of Letters Patent.   Patented May 21, 1918.

Application filed October 6, 1915. Serial No. 54,294.

*To all whom it may concern:*

Be it known that I, CHARLES A. ANDERSON, a citizen of the United States, and a resident of Chicago, in the county of Cook and State of Illinois, have invented certain new and useful Improvements in Fluid-Pumps, of which the following is a specification.

My invention relates to fluid pumps, particularly to air pumps for inflating automobile tires.

My invention pertains to that class of pump adapted to be connected in driving relation with an automobile engine, and the general object of the invention is to produce a more simple and more efficient pump. One of the features of the invention is to provide improved construction and arrangement which dispenses with special valves, particularly check valves, and to do all valving by means of the pump piston. Another feature is the improved simple connection between the piston and the crank shaft which will cause combined reciprocatory and oscillatory movement of the piston in the cylinder in order that air passageways or channels in the piston may coöperate with inlet and outlet air ports to efficiently control the in-flow and out-flow of air, the arrangement involving the reciprocation of the piston at right angles to the crank shaft. Another feature of my invention is the utilization of the crank case for compression and the utilization of such compressed air in the cylinder together with the compression caused in the cylinder by the piston. Another feature involves arrangement for preventing the escape of lubricating oil from the cylinder into the air delivery pipe. Another feature resides in permitting back-flow of compressed air into the cylinder to expand therein to effect cooling before the piston operation to compress air in the cylinder and discharge it therefrom, and another feature resides in the simplicity of the pump and the most efficient operation with a minimum number of parts.

Another important feature of the invention resides in improved mechanism for readily connecting the pump in driving relation with the engine or another driving source.

The various features of the invention are clearly illustrated on the accompanying drawings in which—

Figure 1 is a front elevational view of the pump with part of the cylinder broken away, Fig. 2 is a side view from plane 2—2, Fig. 1, Fig. 3 is a horizontal sectional view on plane 3—3, Fig. 1, Fig. 4 is a side view from the left of Fig. 1, with the crank case cover removed, and Fig. 5 is a complete vertical sectional view with the piston in its lower position.

An integral casting C provides the supporting base 10, the crank case 11, the crank shaft bearing sleeve 12, and the cylinder 13. Journaled in the sleeve 12 is the crank shaft 14 whose inner end has the crank arm 15 terminating in the main bearing section 16, which together with the detachable bearing cap 17 forms a socket 18 for receiving the ball 19 on the end of the horizontal limb $a$ of the L-shaped connecting rod 20 whose vertical limb $b$ at its upper end is pivoted to the wrist pin 22 which extends diametrally through the inverted cup-shaped piston 23. As shown, the wrist pin 22 is at right angles to the crank shaft, and this arrangement together with the L-shaped connecting rod and its ball and socket connection with the crank arm causes combined longitudinal reciprocation and axial oscillation of the piston when the crank shaft is rotated, the outer end of the crank shaft carrying a gear pinion 24 adapted for meshing engagement with a suitable driving gear 25 connected with the vehicle engine or other driving source.

The pump shown has the diametrally opposite air inlet and outlet ports 26 and 27 respectively, a suitable delivery pipe or hose being in practice connected with the outlet port. On the air intake side the piston has the air inlet passageway 28 cut in its face and communicating with the upper end of the cylinder. As the combined reciprocatory and oscillatory movement of the piston causes each point thereon to describe an ellipse the air passageway 28 takes an elliptical direction and its length is such that when the piston is in, the lower end of the channel will be in communication with the intake port 26, and the channel will remain in communication with the port until the piston reaches the outer end of the cylinder so that as the piston travels outwardly air will flow into the cylinder to be compressed during in-stroke of the piston, the axial rotation of the piston when at the lower part of its stroke shifting the channel 28 away from the intake port 26.

At the air outlet side of the pump the piston has the short channel 29 cut in its face, its upper end being connected with the duct 30 which extends through the piston body to the top of the piston to communicate with the cylinder. This passageway 29 also extends elliptically in order that the channel will remain in communication with the outlet port 27 as the piston travels. The relative arrangements of the passageways 28 and 29—30 is such that when the inlet passageway 28 comes into registration with the intake port 26 at the beginning of the down-stroke the passageway 29 will leave the outlet port 27, and the passageway 29 will remain away from the outlet port until the piston has traveled upwardly a distance and effected some compression in the cylinder, the upper end of the channel then registering with the outlet port to permit the compressed air to escape through the channels 30 and 29 and the outlet port, such escape continuing until the piston reaches the top of its stroke and terminating as soon as the air inlet channel 28 again comes into registration with the intake port 26. The relative positions of the piston channels and cylinder ports for the up-position of the piston are clearly shown in Figs. 1, 2 and 3, the piston being ready to rotate in the direction of the arrow and to move downwardly. Immediately upon rotating the channel 28 comes into registration with the air intake port and the outlet channel 29 will leave the outlet port and then during downward movement of the piston the channel 29 will be covered by the cylinder wall and the channel 28 will remain in communication with the intake port for the passage of air from atmosphere to the cylinder above the piston. In Fig. 5, the piston is shown in its lowest position, the upper end of the channel 28 having been carried just beyond the intake port to close it against air inlet, and then during upward movement of the piston both inlet and outlet channels will be closed by the cylinder walls until the piston has traveled upwardly a distance, and then the channel 29 comes into registration with the outlet port 27 (dotted lines Fig. 3) whereupon the air compressed in the cylinder during the fore part of the upward stroke will escape through channels 30 and 29 and the outlet port. Just before the piston reaches the top the channel 29 will again leave the outlet port 27 and then when the piston starts to move downwardly the channel 28 will again come into registration with the intake port 26 to admit another charge of air from atmosphere into the cylinder.

I also provide for compressing air in the crank case and utilizing the compressed air. The crank case is closed to the exterior and therefore when the piston is traveling downwardly air will be compressed therein. In order to permit flow of this compressed air into the cylinder above the piston, either one or both of the piston channels may connect with the gear case at the lower end of the piston stroke. In Fig. 4 (dotted lines) and in Fig. 5 (full lines) the piston is shown in its lower position and it will be noted that the lower ends of channels 28 and 29 are open to the gear case. Compressed air can therefore flow from the gear case into the cylinder above the piston to equalize the pressure, and then the compressed air in the cylinder will be further compressed when the piston is forced upwardly, this additional pressure from the gear case adding greatly to the capacity and efficiency of the pump. When the piston travels upwardly the air in the gear case will be expanded but atmospheric pressure is restored therein through the port 31 and the groove or passageway 32 cut in the piston surface, this groove being of a length to come into communication with the port 31 as soon as further movement of the piston would result in expansion in the crank case and therefore drag on the piston. The groove or channel 32 also extends in elliptical direction in order to keep communication with the port 31 as the piston turns, and the movement of the piston at the upper end of its stroke being practically a turning one, the channel will be disconnected from the port before the piston starts on its downward movement, and then the air in the crank case under atmospheric pressure will be compressed during down-stroke of the piston to be released from the cylinder above the piston through the channels 28 and 29 when the piston reaches its lower position.

The air channels on the piston are made of sufficient width to prevent clogging thereof by dust particles in the air and any such particles are quickly carried through the pump and prevented from accumulating therein. On account of the sliding valving operation the pump is noiseless and there is no chance for the proper valving to fail.

In the lower part of the crank case there is preferably a charge of grease or oil o of sufficient depth so that the crank arm and the end of the piston rod may splash therein to throw the oil about so as to lubricate the piston and cylinder engaging surfaces and the bearings of the piston rod with the piston and crank. In the casting C I preferably leave the opening 33 at the gear case end and provide a cover 34 therefor, this enabling inspection of the interior of the pump, and a smaller opening 35 can be provided in the cover for the charging of oil into the gear case and a plug 36 can be used to close this opening.

As the pump operates oil may tend to accumulate in the outlet channel 29 and flow through the port 27 into the delivery pipe and to the tire or other device to be inflated. However, the pressure in the device to be inflated will soon become greater than the pressure in the cylinder when the channel 29 first comes into register with the outlet port 27 and there will therefore be a sudden and rapid flow of air into the cylinder and this in-rush of air will carry with it any oil in the delivery pipe, port 27, or the piston outlet channels so that when the pressure in the cylinder does overcome that in the device to be inflated the air will flow through the passageways which have been cleaned of oil or other accumulations. Furthermore, the sudden rush of air into the cylinder from the device to be inflated will by its expansion have cooling effect on the cylinder walls and piston. The exterior of the cylinder walls may also be corrugated or flanged as shown to give extensive radiating and cooling surfaces.

In Figs. 1 and 5 the mechanism for controlling the coupling of the pump with a driving source is illustrated. Surrounding the crank shaft bearing sleeve 12 is the hub 37 from which extends the handle or lever 38. The outer end of the hub 37 extends beyond the sleeve 12 and encircles the inner hub 39 on the pinion 24 and this hub has the peripheral groove or run-way 40 for clutch balls 41 retained in pockets 42 in the hub 37, a sleeve 43 surrounding the hub 37 and engaging over the pockets 42 to confine the balls therein and in the run-way 40. The bearing sleeve 12 has also the diagonally extending peripheral groove or run-way 44 for a ball 45 in the pocket 46 in hub 37, and a spring clip 47 secured by a screw 48 engages over the pocket 46 to lock the ball 45 therein, and this screw preferably extends through the sleeve 43 and into the hub 37 to hold the sleeve in place on the hub. The pinion 24 is locked against rotation on the crank shaft by the key 49 and is normally out of the plane of its driving wheel 25. When it is desired to use the pump the lever 38 is swung laterally in the direction of the arrow (Fig. 2) and the ball 45 travels through the diagonal run-way 44, the hub 37 will be shifted outwardly along the crank shaft and the pinion 24 is shifted along the shaft with the hub and is brought into meshing engagement with the drive gear 25. It is evident that the hub 37 could be normally out on the bearing sleeve 12 and the pinion 24 brought into driving relation with a gear by swinging the lever 38 to shift the hub inwardly. The ends of the diagonal runway 44 are preferably deepened to form pockets for more efficiently receiving the ball to yieldingly lock the hub 37 in its in and out positions on the bearing sleeve 12.

In order to prevent inward longitudinal movement of the crank shaft a ring 50 encircles the shaft in the peripheral groove 51 and is confined in the groove adjacent the outer end of the sleeve 12 by the under-cut end 52 of the pinion hub 39. In order to lubricate the crank shaft bearing surfaces a channel 53 is cut through the shaft and is open to the crank case so that oil will be splashed thereinto and delivered to the bearing surfaces when the pump operates. By regulating the amount of oil or grease in the crank case the compression space in the crank case can be made as desired. The greater the amount of oil or grease the less the compression space and the greater the compression.

By loosening screw 48 and withdrawing the plate 47 from the pocket 46 the ball 45 can be removed and then the hub 37 together with the pinion 24 can be removed. Withdrawal of the screw 48 will also release the sleeve 43 and this sleeve can then be readily rotated to bring the hole 54 therein successively into registration with the ball pockets 42 in order that the balls may be withdrawn whereupon the pinion can be disconnected from the hub 37.

The bottom of the crank case may be integral with the casting C but preferably a removable bottom 55 is provided. With this removable bottom and the removable cover 34 it will be very easy to get at the piston rod and its crank and piston connections.

I do not of course desire to be limited to the exact constructions, arrangements and operations shown and described as modifications are no doubt possible which would still come within the scope of the invention.

I claim as follows:

1. In a fluid pump, the combination of a cylinder, a piston, a crank shaft, connections therebetween for effecting reciprocation and oscillation of the piston, inlet and outlet ports for said cylinder, air passageways in said piston for coöperating with the ports to regulate the flow of the fluid, a crank case below said piston, fluid passageways serving to transfer compressed air from the crank case to the cylinder after preliminary compression in the crank case, a fluid vent in said crank case, and a piston channel connecting with the vent to open the crank case to the outside on a predetermined outward movement of the piston.

2. In a fluid pump, the combination of a cylinder, a crank shaft at right angles therewith, a piston within the cylinder, a wrist pin on the piston at right angles with the crank shaft when the piston is at the ends of its longitudial reciprocation in the cylinder, a crank arm on said crank shaft, and an L-shaped connecting rod pivoted at one end on said wrist pin and pivoted at its other end to the crank arm, said connecting rod effecting combined longitudinal reciprocation and rotary oscillation of said piston when the crank shaft is turned.

3. In a fluid pump, the combination of a cylinder, a piston, a crank shaft, a connection between said piston and crank shaft adapted upon rotation of the crank shaft to effect combined longitudinal reciprocation and rotary oscillation of said piston, air inlet and outlet ports for said cylinder and air passageways cut in said piston for coöperating with said ports to control the inflow and out-flow of air, a closed crank case whereby air will be compressed in said case during in-stroke of the piston, means connecting said crank case with the cylinder at the end of the in-stroke of the piston whereby air compressed in the crank case may flow into the cylinder, the air in said crank case being expanded during out-stroke of the piston, an atmosphere vent hole for said crank case, said vent hole being closed during the greater part of the movement of said piston, and a channel cut in said piston for coöperating with said vent hole after a period of outward movement of said piston to connect the crank case with atmosphere.

4. In a fluid pump, the combination of a cylinder, a piston within said cylinder and a crank shaft at right angles to said piston, said cylinder having an inlet at one side and an outlet at the other side and said piston having channels cut in its face to coöperate with said inlet and outlet, a crank arm on said crank shaft, and a connection between said piston and crank arm adapted upon rotation of said crank shaft to effect combined reciprocation and oscillation of said piston during which movement said piston channels coöperate with the inlet and outlet to control the flow to and from said cylinder.

In witness whereof I have hereunto set my hand this 1st day of October, A. D., 1915.

CHARLES A. ANDERSON.

Witnesses:
CHARLES J. SCHMIDT,
LURLINE BULLWINKEL.

Copies of this patent may be obtained for five cents each, by addressing the "Commissioner of Patents, Washington, D. C."